US012562158B2

(12) United States Patent
Lee et al.

(10) Patent No.: US 12,562,158 B2
(45) Date of Patent: Feb. 24, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Kyungmin Lee, Suwon-si (KR);
Sangyoon Kim, Suwon-si (KR);
Hyunsik Kim, Suwon-si (KR);
Aahwan Kudumula, Suwon-si (KR);
Youngho Han, Suwon-si (KR);
Changwoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 323 days.

(21) Appl. No.: 18/119,007

(22) Filed: Mar. 8, 2023

(65) Prior Publication Data

US 2023/0282208 A1     Sep. 7, 2023

Related U.S. Application Data

(63) Continuation    of    application    No. PCT/KR2022/020489, filed on Dec. 15, 2022.

(30) Foreign Application Priority Data

Mar. 4, 2022     (KR) ........................ 10-2022-0028350

(51) Int. Cl.
*G10L 15/197*         (2013.01)
*G06F 3/16*           (2006.01)
(Continued)

(52) U.S. Cl.
CPC ............ *G10L 15/197* (2013.01); *G06F 3/167* (2013.01); *G10L 15/22* (2013.01); *G10L 15/30* (2013.01); *G10L 2015/223* (2013.01)

(58) Field of Classification Search
CPC ....... G10L 15/197; G10L 15/22; G10L 15/30; G10L 2015/223; G10L 15/08;
(Continued)

(56) References Cited

U.S. PATENT DOCUMENTS 6,044,337 A     3/2000  Gorin et al.
8,078,467 B2   12/2011  Wu et al.
(Continued)

FOREIGN PATENT DOCUMENTS

CN       108347646 A     7/2018
JP       2007-286136 A   11/2007
(Continued)

OTHER PUBLICATIONS

Written Opinion (PCT/ISA/237) issued Mar. 29, 2023 from the International Searching Authority in International Application No. PCT/KR2022/020489.
(Continued)

*Primary Examiner* — Bhavesh M Mehta
*Assistant Examiner* — Philip H Lam
(74) *Attorney, Agent, or Firm* — Sughrue Mion, PLLC

(57)         ABSTRACT

Provided are an electronic apparatus and method for performing an operation based on recognizing a user's command utterance without a call word. The method includes identifying a dedicated language model related to a displayed content; receiving an utterance of a user; recognizing the received utterance and identifying candidate texts of the recognized utterance; identifying a similarity between the recognized utterance and the identified candidate texts; identifying, based on the identified dedicated language model and a predetermined threshold value, a suitability of a predetermined number of candidate texts with a high identified similarity, among the candidate texts; based on the identified suitability being outside a predetermined suitabil-
(Continued)

ity range, ignoring the recognized utterance; and based on the identified suitability being in the predetermined suitability range, identifying a candidate text having a highest suitability, among the candidate texts, as the recognized utterance, and performing a corresponding operation.

20 Claims, 7 Drawing Sheets

(51) Int. Cl.
    *G10L 15/22*        (2006.01)
    *G10L 15/30*        (2013.01)
(58) Field of Classification Search
    CPC ......... G10L 2015/085; G10L 2015/228; G10L 15/183; G10L 15/04; G10L 15/26; G10L 25/51; G06F 3/167; G06F 3/16
    See application file for complete search history.

(56)                  References Cited

U.S. PATENT DOCUMENTS

| | | | |
|---|---|---|---|
| 9,269,356 B2 | 2/2016 | Han et al. | |
| 10,636,417 B2 | 4/2020 | Park et al. | |
| 10,643,612 B2 | 5/2020 | Wu et al. | |
| 10,770,065 B2 | 9/2020 | Kim et al. | |
| 11,631,400 B2 | 4/2023 | Lee et al. | |
| 11,631,414 B2 | 4/2023 | Lee | |
| 2005/0182628 A1* | 8/2005 | Choi ....................... G10L 15/08 704/252 |
| 2006/0190256 A1* | 8/2006 | Stephanick .......... G06V 10/987 704/E15.045 |
| 2014/0012575 A1* | 1/2014 | Ganong, III ........ G10L 15/1815 704/239 |
| 2014/0365209 A1* | 12/2014 | Evermann ............... G06F 40/35 704/9 |

| | | | |
|---|---|---|---|
| 2018/0007448 A1* | 1/2018 | Gupta ................ H04N 21/4622 |
| 2018/0053502 A1* | 2/2018 | Biadsy ................... G10L 15/08 |
| 2018/0174580 A1 | 6/2018 | Kim et al. |
| 2018/0203946 A1* | 7/2018 | Kolluru ................. G06N 3/006 |
| 2018/0315417 A1* | 11/2018 | Flaks .................... G10L 15/063 |
| 2019/0295543 A1 | 9/2019 | Wu et al. |
| 2020/0160838 A1* | 5/2020 | Lee ....................... G10L 15/183 |
| 2020/0175969 A1 | 6/2020 | Aleksic et al. |
| 2020/0258504 A1 | 8/2020 | Lee et al. |
| 2020/0312314 A1 | 10/2020 | Mengibar et al. |
| 2021/0065718 A1* | 3/2021 | Choi ....................... G10L 15/32 |
| 2021/0118446 A1 | 4/2021 | Lee |
| 2022/0122602 A1 | 4/2022 | Cho et al. |
| 2022/0180863 A1* | 6/2022 | De Paiva ............ G06F 16/3329 |

FOREIGN PATENT DOCUMENTS

| | | |
|---|---|---|
| KR | 10-0848148 B1 | 7/2008 |
| KR | 10-2014-0022320 A | 2/2014 |
| KR | 10-1597289 B1 | 3/2016 |
| KR | 10-2018-0070970 A | 6/2018 |
| KR | 10-2020-0092464 A | 8/2020 |
| KR | 10-2020-0097993 A | 8/2020 |
| KR | 10-2174148 B1 | 11/2020 |
| KR | 10-2021-0047709 A | 4/2021 |
| KR | 10-2021-0130494 A | 11/2021 |

OTHER PUBLICATIONS

International Search Report (PCT/ISA/210) issued Mar. 29, 2023 from the International Searching Authority in International Application No. PCT/KR2022/020489.
Communication dated Jan. 27, 2025 issued by the European Patent Office in European Patent Application No. 22930041.3.
Communication issued Nov. 17, 2025 by the European Patent Office in European Patent Application No. 25203788.2.

* cited by examiner

| MICROPHONE | ←→ | PROCESSOR | ←→ | DISPLAY |

FIG. 6

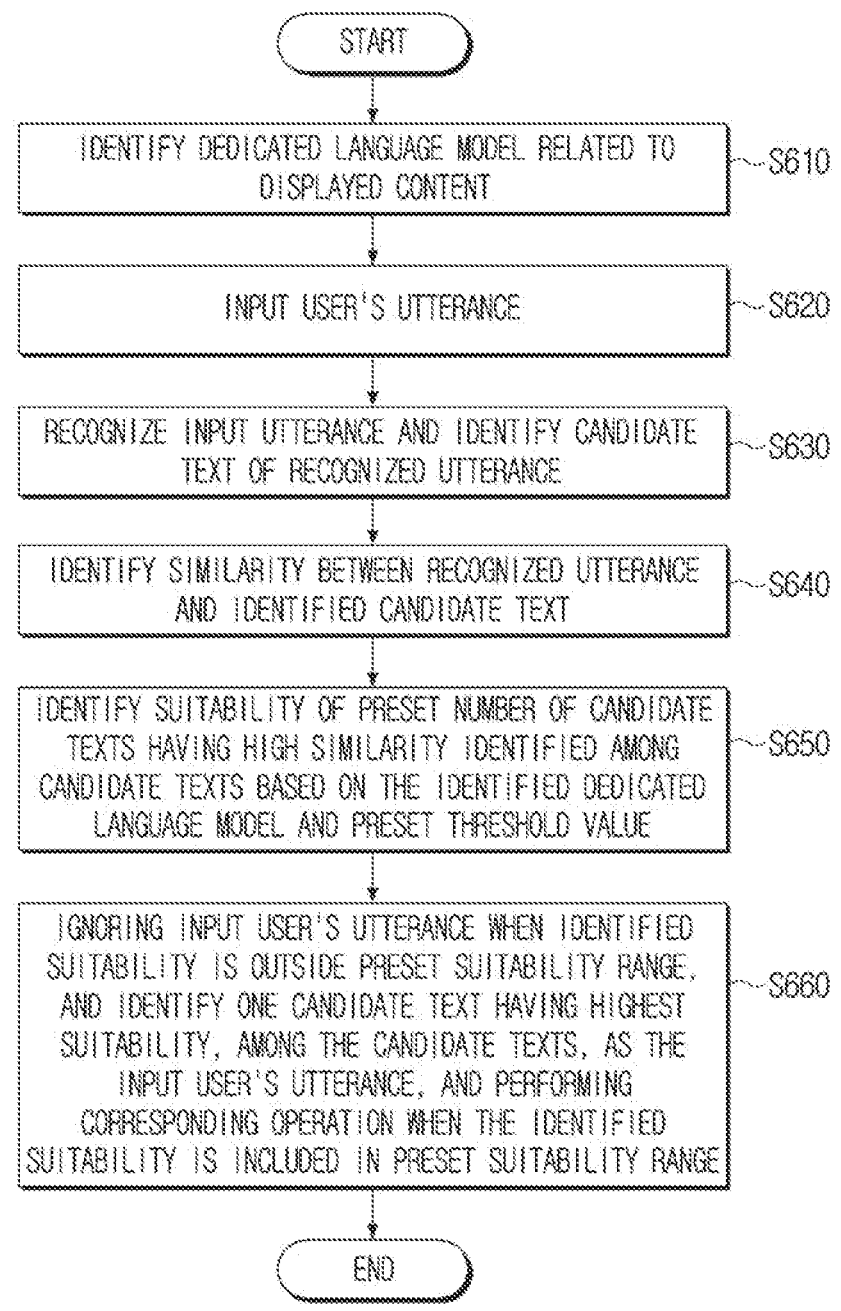

START

IDENTIFY DEDICATED LANGUAGE MODEL RELATED TO DISPLAYED CONTENT ~S610

INPUT USER'S UTTERANCE ~S620

RECOGNIZE INPUT UTTERANCE AND IDENTIFY CANDIDATE TEXT OF RECOGNIZED UTTERANCE ~S630

IDENTIFY SIMILARITY BETWEEN RECOGNIZED UTTERANCE AND IDENTIFIED CANDIDATE TEXT ~S640

IDENTIFY SUITABILITY OF PRESET NUMBER OF CANDIDATE TEXTS HAVING HIGH SIMILARITY IDENTIFIED AMONG CANDIDATE TEXTS BASED ON THE IDENTIFIED DEDICATED LANGUAGE MODEL AND PRESET THRESHOLD VALUE ~S650

IGNORING INPUT USER'S UTTERANCE WHEN IDENTIFIED SUITABILITY IS OUTSIDE PRESET SUITABILITY RANGE, AND IDENTIFY ONE CANDIDATE TEXT HAVING HIGHEST SUITABILITY, AMONG THE CANDIDATE TEXTS, AS THE INPUT USER'S UTTERANCE, AND PERFORMING CORRESPONDING OPERATION WHEN THE IDENTIFIED SUITABILITY IS INCLUDED IN PRESET SUITABILITY RANGE ~S660

END

ELECTRONIC APPARATUS AND CONTROLLING METHOD THEREOF

CROSS-REFERENCE TO RELATED APPLICATION

This application is a bypass continuation of PCT International Application No. PCT/KR2022/020489, which was filed on Dec. 15, 2022, and claims priority to Korean Patent Application No. 10-2022-0028350, filed on Mar. 4, 2022, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus and a controlling method thereof for performing an operation based on recognizing a command utterance without a call word.

2. Description of Related Art

Electronic apparatuses including various functions have been developed. One such function is a voice recognition function. An electronic apparatus with a voice recognition function operates in a voice recognition mode based on recognizing a specific call word. By receiving the call word and then operating in the voice recognition mode, a malfunction due to performing an operation for a user's utterance unrelated to a function of the electronic apparatus is prevented.

However, there is an inconvenience in that the user has to utter the call word every time in order to use the voice recognition function of the electronic apparatus. A technology in which an electronic apparatus operates by recognizing a user's utterance without a call word has been developed, but when the electronic apparatus recognizes the user's utterance without a call word, malfunctions occur due to performing an operation even for an utterance unrelated to a function of the electronic apparatus.

Therefore, there is a need for a technology for reducing malfunctions by identifying an utterance related to a function of the electronic apparatuses from among utterances of users, without a call word.

SUMMARY

Provided are an electronic apparatus and a controlling method thereof, which reduce malfunction by identifying an utterance related to an operation of the electronic apparatus, among utterances of a user, without a call word.

According to an aspect of the disclosure, a method of controlling an electronic apparatus, includes: identifying a dedicated language model related to a displayed content; receiving an utterance of a user; recognizing the received utterance and identifying candidate texts of the recognized utterance; identifying a similarity between the recognized utterance and the identified candidate texts; identifying, based on the identified dedicated language model and a predetermined threshold value, a suitability of a predetermined number of candidate texts with a high identified similarity, among the candidate texts; based on the identified suitability being outside a predetermined suitability range, ignoring the recognized utterance; and based on the identified suitability being in the predetermined suitability range, identifying a candidate text having a highest suitability, among the candidate texts, as the recognized utterance, and performing a corresponding operation.

The identifying the dedicated language model may include identifying the dedicated language model based on at least one of a type of displayed content, a displayed menu, and a displayed input command.

The identifying the candidate text of the recognized utterance may include identifying at least one of a candidate word, a candidate word segment, and a candidate root based on at least one of a word, a word segment, and a root included in the received utterance, and identifying the candidate text by combining the identified at least one of the candidate word, the candidate word segment, and the candidate root.

The identifying the similarity may include identifying the similarity based on a general-purpose text database and identifying the predetermined number of candidate texts with the high identified similarity.

The identifying the suitability may include calculating a word-by-word geometric mean of entropy in which a word included in the candidate text is to appear for each of the predetermined number of candidate texts based on the identified dedicated language model.

The identifying the suitability may include identifying the suitability by determining whether the predetermined number of candidate texts are in the predetermined suitability range based on the predetermined threshold value and a geometric mean for each word calculated for each of the predetermined number of candidate texts.

The identifying the suitability may include identifying one candidate text having a geometric mean for each word calculated to be the lowest.

The method may further include: generating a filtering language model including the ignored recognized utterance; and ignoring the recognized utterance based on the recognized utterance being included in the utterance included in the filtering language model.

According to an aspect of the disclosure, an electronic apparatus includes: a display configured to display content; a microphone configured to receive an utterance of a user; a memory storing instructions; and a processor configured to execute the instructions to: identify a dedicated language model related to a displayed content, recognize the received utterance to identify candidate texts of the recognized utterance, identify a similarity between the recognized utterance and the identified candidate texts, identify, based on the identified dedicated language model and a predetermined threshold value, a suitability of a predetermined number of candidate texts with a high identified similarity, among the candidate texts, based on the identified suitability being outside a predetermined suitability range, ignore the recognized utterance, and based on the identified suitability being in the predetermined suitability range, identify a candidate text having a highest suitability, among the candidate texts, as the recognized utterance and perform a corresponding operation.

The processor may be further configured to execute the instructions to identify the dedicated language model based on at least one of a type of displayed content, a displayed menu, and a displayed input command.

The processor may be further configured to execute the instructions to identify at least one of a candidate word, a candidate word segment, and a candidate root based on at least one of a word, a word segment, and a root included in the received utterance, and identify the candidate text by combining the identified at least one of the candidate word, the candidate word segment, and the candidate root.

The processor may be further configured to execute the instructions to identify the similarity based on a general-purpose text database, and identify the predetermined number of candidate texts with the high identified similarity.

The processor may be further configured to execute the instructions to calculate a word-by-word geometric mean of entropy in which a word included in the candidate text will appear for each of the predetermined number of candidate texts based on the identified dedicated language model.

The processor may be further configured to execute the instructions to identify the suitability by determining whether the predetermined number of candidate texts are in the predetermined suitability range based on the predetermined threshold value and a geometric mean for each word calculated for each of the predetermined number of candidate texts.

The processor may be configured to identify one candidate text having a geometric mean for each word calculated to be the lowest.

According to an aspect of the disclosure, a non-transitory computer readable medium for storing computer readable program code or instructions which are executable by one or more processors to perform a method of controlling an electronic apparatus, the method including: identifying a dedicated language model related to a displayed content; receiving an utterance of a user; recognizing the received utterance and identifying candidate texts of the recognized utterance; identifying a similarity between the recognized utterance and the identified candidate texts; identifying, based on the identified dedicated language model and a predetermined threshold value, a suitability of a predetermined number of candidate texts with a high identified similarity, among the candidate texts; based on the identified suitability being outside a predetermined suitability range, ignoring the recognized utterance; and based on the identified suitability being in the predetermined suitability range, identifying a candidate text having a highest suitability, among the candidate texts, as the recognized utterance, and performing a corresponding operation.

The identifying the dedicated language model may include identifying the dedicated language model based on at least one of a type of displayed content, a displayed menu, and a displayed input command.

The identifying the candidate text of the recognized utterance may include identifying at least one of a candidate word, a candidate word segment, and a candidate root based on at least one of a word, a word segment, and a root included in the received utterance, and identifying the candidate text by combining the identified at least one of the candidate word, the candidate word segment, and the candidate root.

The identifying the similarity may include identifying the similarity based on a general-purpose text database and identifying the predetermined number of candidate texts with the high identified similarity.

The identifying the suitability may include calculating a word-by-word geometric mean of entropy in which a word included in the candidate text is to appear for each of the predetermined number of candidate texts based on the identified dedicated language model.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a block diagram illustrating a configuration of an electronic apparatus according to an embodiment of the disclosure;

FIG. 6 is a flowchart illustrating a method of controlling an electronic apparatus according to an embodiment of the disclosure.

DETAILED DESCRIPTION

Figure 2:
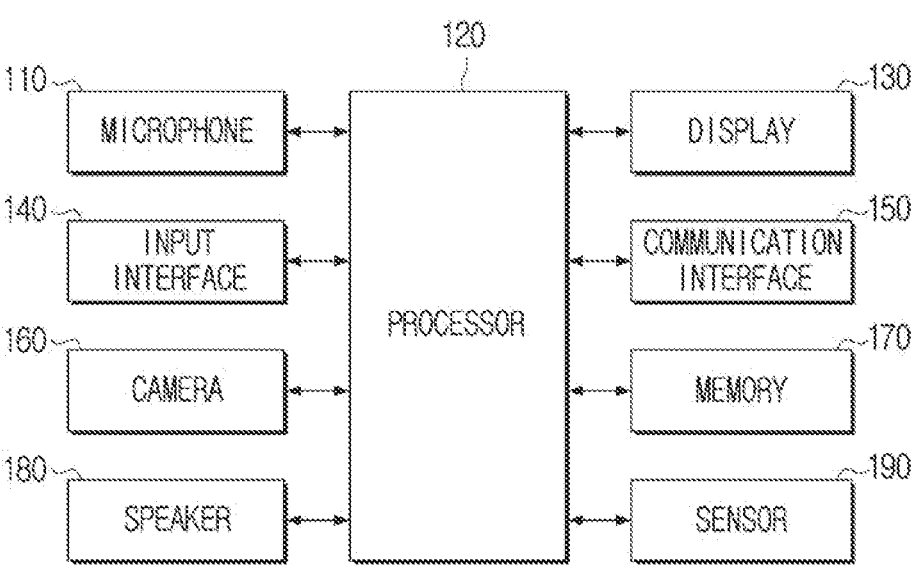
FIG. 2 is a block diagram illustrating a detailed configuration of an electronic apparatus according to an embodiment of the disclosure.

Hereinafter, various embodiments will be described in detail with reference to the accompanying drawings. The embodiments described herein may be variously modified. Specific embodiments may be illustrated in the drawings and described in detail in the detailed description. It should be understood, however, that the specific embodiments disclosed in the accompanying drawings are intended only to facilitate understanding of various embodiments. Therefore, the technical idea is not limited by the specific embodiments disclosed in the accompanying drawings but includes all equivalents or alternatives falling within the spirit and scope of the disclosure.

Terms including ordinals, such as first, second, etc., may be used to describe various elements but such elements are not limited to the above terms. The above terms are used only for the purpose of distinguishing one component from another.

In this specification, the terms "comprise" or "have" and the like, are intended to specify the presence of stated features, integers, steps, operations, elements, parts, or combinations thereof, but do not preclude the presence or addition of one or more other features, integers, steps, operations, elements, components, or combinations thereof. It is to be understood that when an element is referred to as being "connected" to another element, it may be directly on or directly connected to the other element or layer, or intervening elements or layers may be present. When an element is referred to as being "directly connected" to another element, it should be understood that there are no other elements in between.

In the meantime, "module" or "part" for components used in the present specification performs at least one function or operation. Also, "module" or "part" may perform functions or operations by hardware, software, or a combination of hardware and software. Also, a plurality of "modules" or a plurality of "parts" except for a "module" or "part" to be performed in a specific hardware or performed in at least one processor may be integrated into at least one module. The singular expressions include plural expressions unless the context clearly dictates otherwise.

In the description of the disclosure, the order of each step or operation should be understood to be non-limiting, unless a preceding step or operation must be performed logically and temporally before a subsequent step or operation. In other words, except for the exceptional case above, even if a process described as a subsequent step or operation is performed before a process described as a preceding step or operation, the nature of the disclosure is not affected and the claim should be defined regardless of order of the steps or operations. In this disclosure, "A or B" is defined to refer to include both A and B as well as selectively indicating either A or B. It is also to be understood that the term "comprise" is intended to encompass other elements in addition to the elements listed as being included.

In this specification, only essential components necessary for the description of the disclosure are described and components not related to the essence of the disclosure are not mentioned. Also, the mentioned components should not be construed to be included in an exclusive sense but should be construed in a non-exclusive sense to include any other component.

In addition, in the description of the disclosure, when it is determined that a detailed description of known functions or components related thereto may unnecessarily obscure the gist of the disclosure, the detailed description thereof will be abbreviated or omitted. Each embodiment may be independently implemented or operated, but each embodiment may be implemented or operated in combination.

Figure 1:
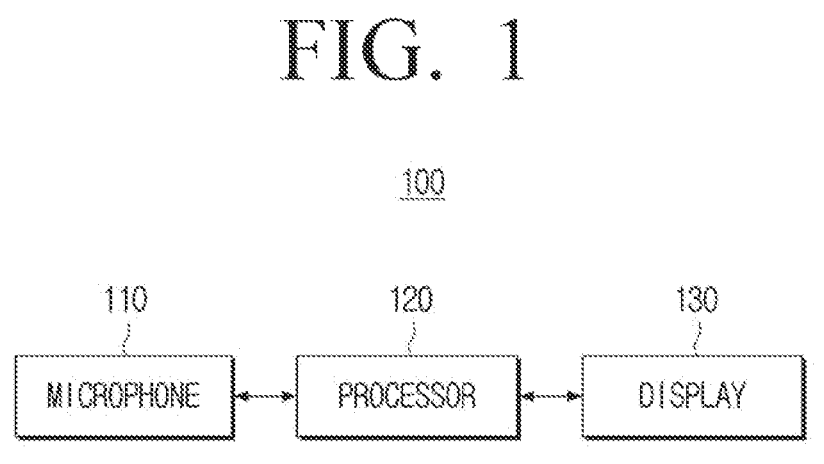

FIG. 1 is a block diagram illustrating a configuration of an electronic apparatus according to an embodiment of the disclosure.

Referring to FIG. 1, an electronic apparatus 100 may include a microphone 110, a processor 120, and a display 130.

The microphone 110 may receive a user's utterance. The electronic apparatus 100 may include a single microphone 110, and may include a plurality of microphones 110. For example, the microphone 110 may include a general microphone, a surround microphone, a directional microphone, and the like.

The processor 120 may control each component of the electronic apparatus 100. For example, the processor 120 may control the microphone 110 to receive a user's utterance and may control the display 130 to output content. The processor 120 may identify a dedicated language model related to displayed content. For example, the processor 120 may identify the dedicated language model based on a type of displayed content, a displayed menu, a type of a displayed input command, and the like. In an embodiment, when the displayed content is advertisement content, the processor 120 may identify a dedicated language model for the advertisement content capable of recognizing skipping of advertisements, interruption of advertisement playing, and the like. Alternatively, when the displayed content includes a list of contents, the processor 120 may identify a dedicated language model for a content menu capable of recognizing a content name, a selection command, a content category, and the like. Alternatively, when displayed content includes menus, such as play, pause, forwarding, and rewarding, the processor 120 may identify a dedicated language model for input commands capable of recognizing play, pause, forwarding, and rewarding.

The electronic apparatus 100 may receive an utterance from a user as an input, while playing content. The received utterance may be one or more words, one or more word segments, or sentences. The processor 120 may recognize the received utterance and identify candidate texts of the recognized utterance. For example, the processor 120 may translate a received utterance voice into text and identify candidate texts of the translated utterance. The processor 120 may identify a candidate word, a candidate word segment, and a candidate root based on a word, a word segment, a root, etc. included in the received utterance. Also, the processor 120 may identify the candidate texts by combining the identified candidate word, candidate word segment, or candidate root.

The processor 120 may identify a similarity between the recognized utterance and the identified candidate texts. For example, the processor 120 may identify a similarity based on a general-purpose text database and identify a predetermined number of candidate texts with a high similarity. Also, the processor 120 may identify a suitability of a predetermined number of candidate texts with a high identified similarity among the candidate texts based on the identified dedicated language model and a predetermined threshold value. In an embodiment, the processor 120 may calculate a word-by-word geometric mean of entropy in which a word included in the candidate text will appear for each of a predetermined number of candidate texts based on the identified dedicated language model. The processor 120 may identify the suitability by determining whether a predetermined number of candidate texts are included in a suitability range based on the predetermined threshold value and the geometric mean for each word calculated for each of the predetermined number of candidate texts. In addition, the processor 120 may identify one candidate text having a geometric mean for each word calculated to be the lowest.

In an embodiment, similarity and suitability regarding the identified candidate text may be identified based on a trained artificial intelligence (AI) model. The processor 120 may include one or more processors. In this case, the one or more processors may include general-purpose processors, such as central processing units (CPUs), application processors (Aps), digital signal processors (DSPs), or the like, graphics-only processors (GPUs), vision processing units (VPUs), or artificial intelligence processors, such as neural processing units (NPUs). The processor 120 may be configured to process input data according to a predefined action rule or AI model stored in a memory. In an embodiment, the processor 120 may include one or more AI processors designed with a hardware structure specialized for processing a specific AI model.

The predefined action rule or AI model may be created through learning. For example, a basic AI model may be trained by a learning algorithm using a plurality of learning data, so that the predefined action rule or AI model set to perform a desired characteristic (or purpose) is created. Such learning may be performed in a device (e.g., electronic apparatus 100) in which AI according to the disclosure is performed, or may be performed through a separate server and/or system. The learning algorithm may include, but is not limited to, supervised learning, unsupervised learning, semi-supervised learning, or reinforcement learning.

The AI model may include a plurality of neural network layers. Each of the plurality of neural network layers has a plurality of weight values, and a neural network calculation at a current layer is performed based on a calculation result of a previous layer and the plurality of weight values. The plurality of weight values of the plurality of neural network layers may be optimized by a learning result of the AI model. For example, a plurality of weight values may be updated so that a loss value or a cost value obtained by the AI model during a learning process is reduced or minimized. The artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or deep Q-networks, but is not limited thereto. A detailed process in which the processor 120 identifies a similarity and a suitability will be described later.

The processor 120 may ignore the received utterance when an identified suitability is outside a predetermined suitability range. Alternatively, when the identified suitability is within the predetermined suitability range, the processor 120 may identify a candidate text having a highest suitability as the received utterance and perform a corresponding operation. Also, the processor 120 may generate a separate language model based on the ignored utterance. The processor 120 may generate a filtering language model including the ignored utterance. For example, the aforementioned dedicated language model may be a positive language model (PLM), and the filtering language model may be a negative language model (NLM). When the received utterance is recognized, and the recognized utterance is included in the filtering language model, the processor 120 may ignore the recognized utterance. Also, the processor 120 may continuously update the filtering language model based on the ignored utterance. A detailed process in which the processor 120 processes the received utterance using the positive language model and the negative language model will be described later.

The display 130 may output data processed as an image by the processor 120. The display 130 may display content and may output a screen corresponding to the recognized utterance. For example, the display 130 may be implemented as a liquid crystal display (LCD), an organic light emitting diode (OLED), a flexible display, a touch screen, or the like. When the display 130 is implemented as a touch screen, the electronic apparatus 100 may receive an input (e.g., a control command) through the touch screen.

FIG. 2 is a block diagram illustrating a detailed configuration of an electronic apparatus according to an embodiment of the disclosure.

Referring to FIG. 2, the electronic apparatus 100 may include the microphone 110, processor 120, display 130, an input interface 140, a communication interface 150, a camera 160, a memory 170, a speaker 180, and a sensor 190. The microphone 110 and the display 130 may be the same as those described above with reference to FIG. 1.

The input interface 140 may receive a control command input from the user. For example, the input interface 140 may include a key pad, a touch pad, a touch screen, and the like. In an embodiment, the input interface 140 may include an input/output (I/O) port to receive input data. For example, the input interface 140 may receive a video including sound and an image. The I/O port may include a high-definition multimedia interface (HDMI), a display port (DP), RGB, a digital visual interface (DVI), a universal serial bus (USB), thunderbolt, LAN, AUX, and the like. The input interface 140 may also be referred to as an input device, an input unit, an input module, or the like. When the input interface 140 performs an I/O function, it may also be referred to as an I/O device, an I/O unit, an I/O module, or the like.

The communication interface 150 may communicate with an external device. For example, the communication interface 150 may perform communication with an external device through at least one communication method, such as Wi-Fi, Wi-Fi direct, Bluetooth, ZigBee, 3rd Generation (3G), 3rd Generation Partnership Project (3GPP), and Long-Term Evolution (LTE). The communication interface 150 may receive content, data for content-related menus, input commands, and the like, from an external device. The communication interface 150 may also be referred to as a communication device, a communication unit, a communication module, a transceiver, and the like.

The camera 160 may capture an image of at least a part of an environment of the electronic apparatus 100. In an embodiment, the camera 160 may capture an image of a user's facial expression, motion, and the like. The processor 120 may acquire information on the environment based on an image captured by the camera 160. The processor 120 may perform an operation based on the user's facial expression, motion, and the like. In an embodiment, the camera 160 may include various types of cameras performing different functions. In an embodiment, the camera 160 may include one or more cameras of the same type. For example, the camera 160 may include a CCD sensor or a CMOS sensor. In addition, the camera 160 may include an RGB camera, a depth camera, a wide-angle camera, a telephoto camera, and the like.

The memory 170 may store data, algorithms, and the like for performing a function of the electronic apparatus 100. The memory 170 may also store programs and instructions, executed by the processor 120 to control an operation of the electronic apparatus 100. For example, the memory 170 may store an AI algorithm for voice recognition. The processor 120 may recognize a user's utterance as an input using the AI algorithm for voice recognition, and determine whether the utterance corresponds to a control command or is unrelated to a control command. The algorithm stored in the memory 170 may be used by the processor 120 to perform object identification or sound processing. The memory 170 may be implemented as, for example, a type of ROM, RAM, HDD, SSD, memory card, or the like.

The speaker 180 may output a sound signal, such as a voice or a notification sound. For example, the speaker 180 may output information on a user's utterance that was recognized as an input command, status-related information of the electronic apparatus 100, or operation-related information of the electronic apparatus 100.

The sensor 190 may detect an object proximate to the electronic apparatus 100. The processor 120 may recognize a control command based on the detected object, and perform a control operation corresponding to the recognized control command. In an embodiment, the sensor 190 may detect information on an environment of the electronic apparatus 100, and the processor 120 may perform a control operation based on the detected information on the environment. For example, the sensor 190 may include an acceleration sensor, a gravity sensor, a gyro sensor, a geomagnetic sensor, a direction sensor, a motion recognition sensor, a proximity sensor, a voltmeter, an ammeter, a barometer, a hygrometer, a thermometer, an illuminance sensor, a heat sensor, and a touch sensor, an infrared sensor, an ultrasonic sensor, and the like.

Figure 3:
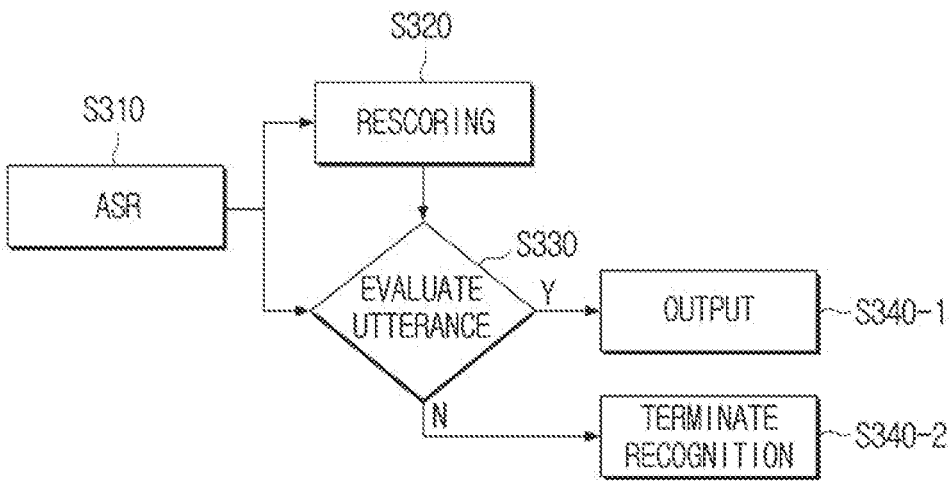
FIG. 3 is a diagram illustrating a process of determining whether to perform an operation based on a user's utterance according to an embodiment of the disclosure.
Figure 4:
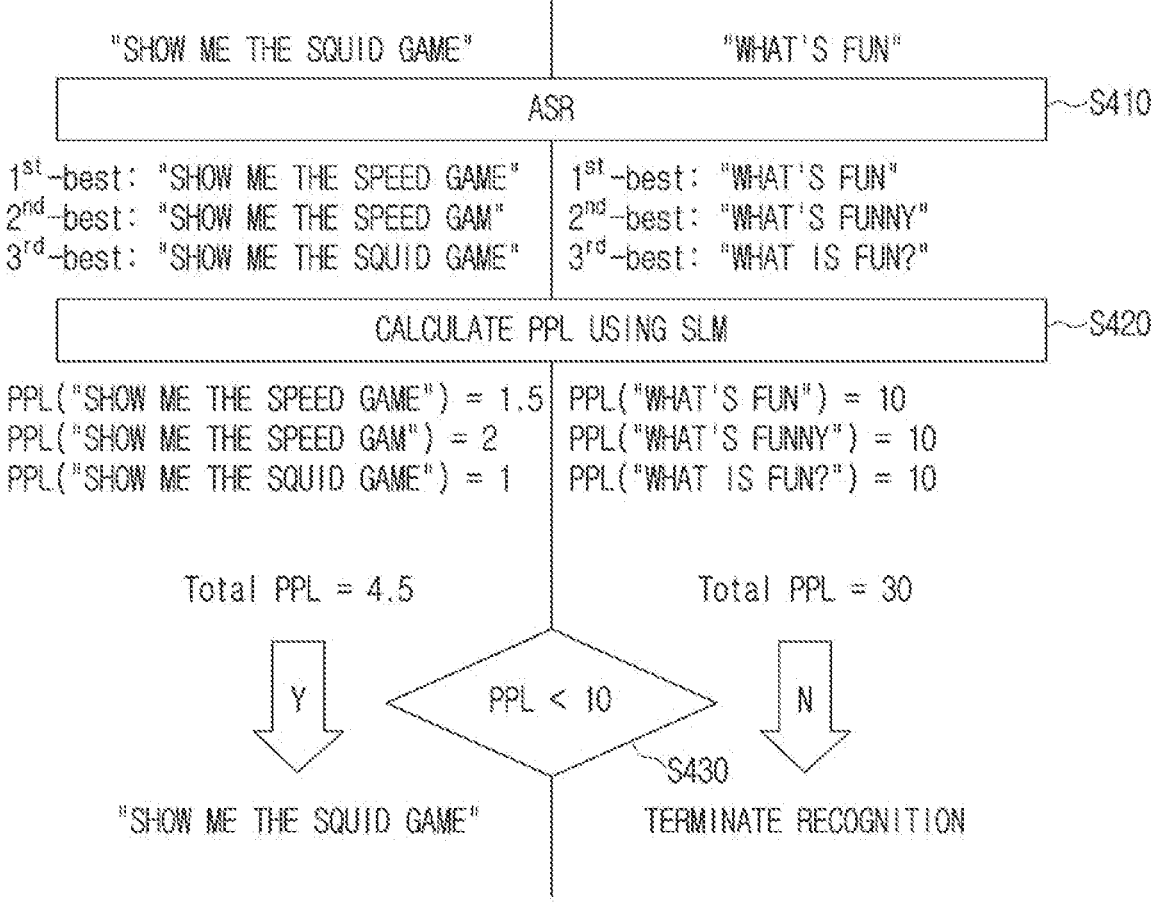
FIG. 4 is a diagram illustrating a process of determining whether to perform an operation based on a user's utterance according to an embodiment of the disclosure.

FIGS. 3 and 4 are diagrams illustrating processes of determining whether to perform an operation based on a user's utterance according to embodiments of the disclosure.

Referring to FIGS. 3 and 4, the electronic apparatus 100 may recognize a user's utterance (uttered voice) as an input through an automatic speech recognition (ASR) function (S310 and S410). For example, as shown in FIG. 4, when the user utters "Show me the squid game", the electronic apparatus 100 may recognize the uttered voice and identify candidate texts of the recognized utterance. In an embodiment, the electronic apparatus 100 may identify a candidate word, a candidate word segment, a candidate root, etc. based on a word, a word segment, a root, etc. included in the input utterance. In addition, the electronic apparatus 100 may generate a plurality of candidate texts by combining the identified candidate word, candidate word segment, candidate root, and the like. For example, the candidate text of the user's uttered voice may include text, such as "Show me the speed game", "Show me the speed gam", and "Show me the squid game". In an embodiment, when the user utters "what's fun", the electronic apparatus 100 may recognize the uttered voice and include text, such as "what's fun", "what's funny", "what is fun?", etc.

The electronic apparatus 100 may identify a similarity (a match probability of the uttered voice) based on a general-purpose text database (or a general-purpose language model) and may identify a predetermined number of candidate texts with a high similarity. The general-purpose text database may refer to a database that may determine all languages in general, rather than a database (or model) for a specific purpose.

In an embodiment, the electronic apparatus 100 may receive the uttered voice and decode the input uttered voice. The electronic apparatus 100 may identify a similarity of the uttered voice based on the Bayesian theorem, assuming that an appearance probability p(x) of a speech signal x is the same. The electronic apparatus 100 may use a general-purpose text database (or a general-purpose language model) to identify the similarity of the uttered voice. That is, the electronic apparatus 100 may identify a word (or a syllable, a word, etc.) having a high probability of being recognized from the uttered voice, and identify a word having a high match probability of the identified word among the words included in the general-purpose text database, as a word of the uttered voice. In an embodiment, the electronic apparatus 100 may identify the similarity of the uttered voice by using a trained AI neural network model and the general-purpose text database. That is, the electronic apparatus 100 may identify a word having a high similarity from the uttered voice based on the trained AI neural network, and identify a word having a high match probability of the identified word among the words included in the general-purpose text database as a word of the uttered voice. The electronic apparatus 100 may identify the candidate text with a high similarity through the process described above.

In an embodiment, the electronic apparatus 100 may use an n-best method when identifying the similarity of the uttered voice. That is, the electronic apparatus 100 may determine n candidate texts with a high similarity. Since each candidate text has a different match probability with the uttered voice, candidate texts may be identified in an order of high probability. Since the similarity is determined based on the general-purpose text database, there may be a difference between the candidate text identified as having the highest similarity and the recognized uttered voice.

After identifying the n candidate texts, the electronic apparatus 100 may perform a rescoring process as a post-processing process (S320). The electronic apparatus 100 may recalculate the similarity of the candidate texts by performing a rescoring process on the n candidate texts. Since only n scores are calculated, the electronic apparatus 100 may perform post-processing without a long delay time.

The electronic apparatus 100 may evaluate a suitability based on the identified dedicated language model and the predetermined threshold value for m predetermined candidate texts with high similarity among n candidate texts with high similarity (S330 and S420). In an embodiment, the suitability may be evaluated using a perplexity (PPL) method. PPL refers to a word-by-word geometric mean of entropy in which each word is to appear, and a lower value means better suitability. The electronic apparatus 100 calculates entropy H for m candidate texts, that is, [w1, w2, . . ., wm]. In this case, since it is impossible for the electronic apparatus 100 to know a population, the electronic apparatus 100 may use an approximate value Ĥ calculated as follows within the sampled text:

$$\hat{H} = -\frac{1}{m}\log_2 P(w_1, w_2, \dots, w_m)$$

The suitability may be calculated as $PPL=2^{\hat{H}}$. PPL is denoted as a positive real value, and a smaller value means better suitability for a dedicated language model. Also, it may be determined whether the utterance is to be processed by the electronic apparatus 100 based on the predetermined threshold value.

In an embodiment, in relation to the user's utterance of "Show me the squid game" described above, the electronic apparatus 100 may determine that PPL ("Show me the speed game")=1.5, PPL ("Show me the speed gam")=2, and PPL ("Show me the squid game")=1. Also, the set threshold value may be set to an appropriate value (e.g., 10).

The electronic apparatus 100 may determine whether the determined suitability is within the suitability range based on the set threshold value (S430). Since the total sum of the PPLs is 4.5, which is lower than the threshold value of 10, the electronic apparatus 100 may determine that the identified suitability is included in the set suitability range. In addition, the electronic apparatus 100 may identify the candidate text of "Show me the squid game" having the lowest PPL as the input user's utterance and perform a corresponding operation.

Alternatively, in relation to the user's utterance of "what's fun", the electronic apparatus 100 may determine that PPL ("what's fun")=10, PPL("what's funny")=10, PPL("what is fun?")=10. Since the sum of the PPLs is 30, which is higher than the threshold value of 10, the electronic apparatus 100 may determine that the identified suitability is outside the set suitability range. Accordingly, the electronic apparatus 100 may ignore the input user's utterance and terminate recognition.

The method of determining suitability described above is an example, and suitability of the candidate text may be evaluated in various manners. For example, the electronic apparatus 100 may evaluate the suitability based on a match probability with the text included in the language model. In the example described above, the sum of the evaluated suitability is compared with the threshold value, but a mean of the evaluated suitability may be compared with the threshold value. Alternatively, in the example described above, when the evaluated suitability is smaller than the threshold value, the electronic apparatus 100 determines that the evaluated suitability is within the suitability range, but depending on a suitability evaluation method, when the evaluated suitability is greater than the threshold value, the electronic apparatus 100 may determine that the evaluated suitability is within the suitability range.

In the embodiment above, the process of determining a candidate text using the dedicated language model has been described. The dedicated language model may be a positive language model. That is, the electronic apparatus 100 may determine the suitability of the candidate text using only the positive language model.

Alternatively, the electronic apparatus 100 may evaluate the suitability of the candidate text by using the dedicated language model and a filtering language model. The dedicated language model may be a positive language model, and the filtering language model may be a negative language model. For example, the electronic apparatus 100 may evaluate the suitability of the candidate text based on the dedicated language model. The electronic apparatus 100 may evaluate the suitability by adding or subtracting an evaluation value according to a match probability based on the language model.

The electronic apparatus 100 may evaluate an unsuitability based on the filtering language model simultaneously or sequentially with the process described above. The electronic apparatus 100 may calculate a suitability evaluation value for the candidate text to be evaluated according to whether it matches the text included in the dedicated language model, and may calculate an unsuitability evaluation value according to whether it matches the text included in the filtering language model. The electronic apparatus 100 may evaluate the suitability of the candidate text based on the calculated suitability evaluation value and the unsuitability evaluation value. In an embodiment, when the suitability is evaluated in a positive manner, the electronic apparatus 100 may evaluate the suitability of the candidate text by adding a suitability evaluation value and subtracting an unsuitability evaluation value. Alternatively, when the suitability is evaluated in a negative manner, the electronic apparatus 100 may evaluate the suitability of the candidate text by subtracting the suitability evaluation value and adding the unsuitability evaluation value.

Figure 5A:
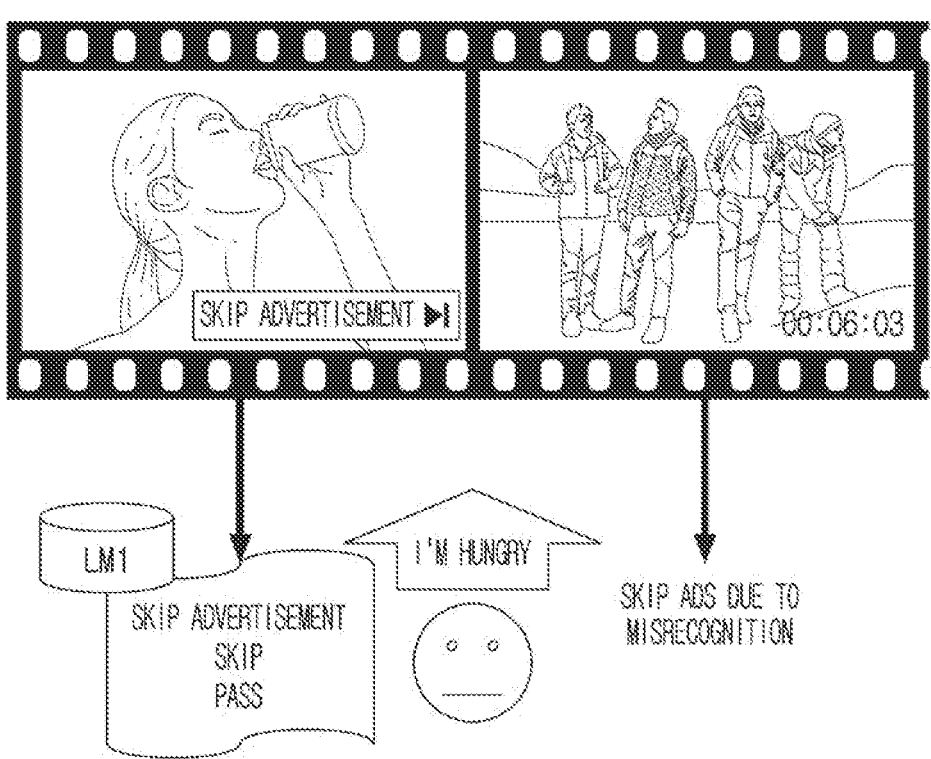
FIG. 5A is a view illustrating an example of a malfunctioning electronic apparatus in the related art.
Figure 5B:
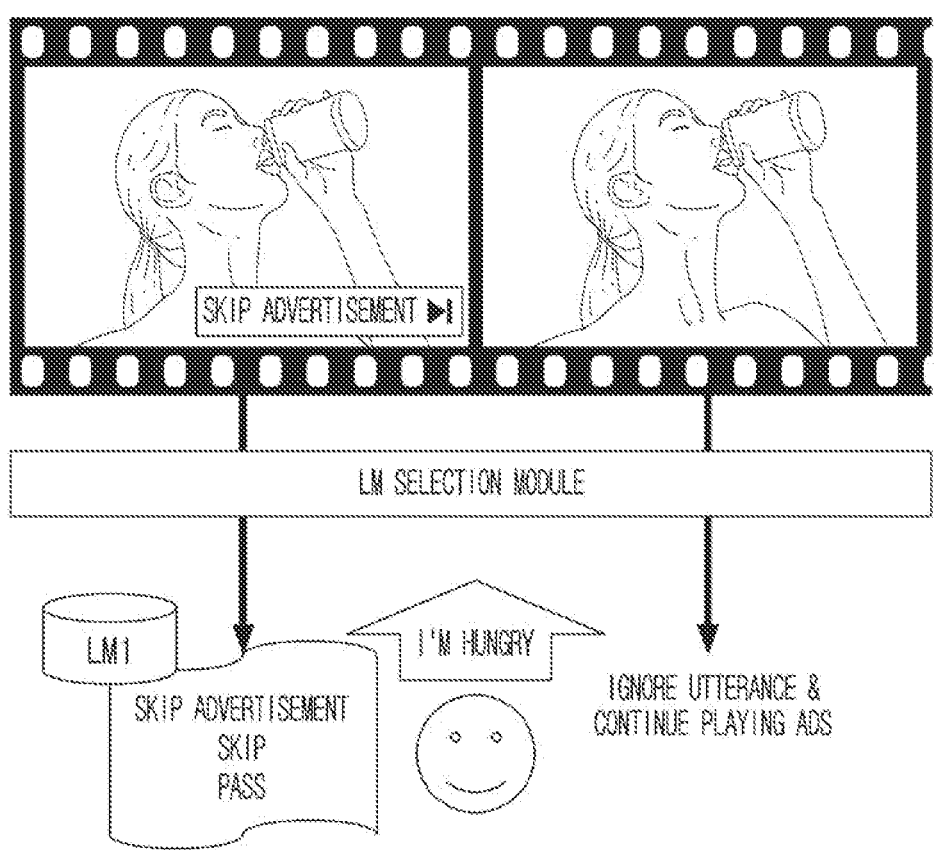
FIG. 5B is a view illustrating an electronic apparatus performing a normal operation based on a user's utterance according to an embodiment of the disclosure.

FIG. 5A is a view illustrating an example of a malfunctioning electronic apparatus in the related art, and FIG. 5B is a view illustrating an electronic apparatus performing a normal operation according to a user's utterance according to an embodiment of the disclosure. This will be described with reference to FIGS. 5A and 5B together.

Referring to FIGS. 5A and 5B, the electronic apparatus displays advertisement content. The electronic apparatus may select a dedicated language model LM1 related to the displayed advertisement content. For example, the LM1 may recognize utterances, such as advertisement skipping, skip, and pass. The user may make an utterance "I'm hungry" that is not related to a control command.

In the case of the related art illustrated in FIG. 5A, a text most similar to the uttered voice "I'm hungry" uttered by the user is recognized based on the voice recognition model. In an embodiment, the electronic apparatus may determine that the user's utterance voice "I am hungry" is most similar to the text "Advertisement skipping". Accordingly, the electronic apparatus performs an erroneous operation of skipping an advertisement based on the user's uttered voice.

In contrast, in the case of the disclosure illustrated in FIG. 5B, as described above, the electronic apparatus 100 may identify candidate text and similarity based on the general-purpose text database (or model). Also, based on the identified similarity, suitability may be identified based on m candidate texts and the dedicated language model. The electronic apparatus 100 may determine that the suitability of the user's uttered voice "I'm hungry" is low, and may ignore the input user's uttered voice and terminate recognition. Accordingly, the electronic apparatus 100 may continue to play the advertisement being currently played. That is, since the electronic apparatus 100 performs a re-recognition process using the dedicated language model, the accuracy of a recognition rate of the user's uttered voice may be increased, and malfunctions may be reduced in a voice recognition environment in which a call word is not input.

The electronic apparatus 100 may generate a filtering language model including the ignored utterance. When determining that the input user's utterance is an utterance included in the filtering language model, the electronic apparatus 100 may ignore the input user's utterance. Also, the electronic apparatus 100 may update the filtering language model as the number of ignored utterances increases. Accordingly, the electronic apparatus 100 of the disclosure may more accurately determine the user's utterance unrelated to the operation.

Up to now, various embodiments of reducing a malfunction by accurately recognizing a user's utterance have been described. Hereinafter, a method of controlling an electronic apparatus 100 will be described.

FIG. 6 is a flowchart illustrating a method of controlling an electronic apparatus 100 according to an embodiment of the disclosure.

Referring to FIG. 6, the electronic apparatus 100 identifies a dedicated language model related to displayed content (S610). For example, the electronic apparatus 100 may identify a dedicated language model based on a type of displayed content, a displayed menu, a type of the displayed input command, and the like.

When the electronic apparatus 100 receives the user's utterance (S620), the electronic apparatus 100 recognizes the input utterance and identifies candidate texts of the recognized utterance (S630). For example, the electronic apparatus 100 may identify a candidate word, a candidate word segment, a candidate root, etc. based on a word, a word segment, a root, etc. included in the input utterance. Also, the electronic apparatus 100 may identify a candidate text by combining the identified candidate word, candidate word segment, or candidate root.

The electronic apparatus 100 identifies a similarity between the recognized utterance and the identified candidate text (S640). For example, the electronic apparatus 100 may identify a similarity based on a general-purpose text database (general-purpose language model), and may identify a predetermined number of candidate texts with a high similarity.

The electronic apparatus 100 identifies suitability of a predetermined number of candidate texts with a high identified similarity among the candidate texts based on the identified dedicated language model and a predetermined threshold value (S650). For example, the electronic apparatus 100 may calculate a word-by-word geometric mean of entropy in which a word included in the candidate text is to appear for each of the predetermined number of candidate texts based on the identified dedicated language model. The electronic apparatus 100 may determine whether the predetermined number of candidate texts are included in a suitability range based on a predetermined threshold value and a geometric mean for each word calculated for each of the predetermined number of candidate texts. In an embodiment, the electronic apparatus 100 may identify one candidate text having a geometric mean for each word calculated to be the lowest.

When the identified suitability is outside the predetermined suitability range, the electronic apparatus 100 ignores the input user's utterance. Also, when the identified suitability falls within the predetermined suitability range, the electronic apparatus 100 identifies one candidate text having the highest suitability among the candidate texts as the input user's utterance and performs a corresponding operation (S660).

Also, the electronic apparatus 100 may generate a filtering language model including the ignored utterance. When the recognized utterance is included in the utterance included in the filtering language model, the electronic apparatus 100 may ignore the recognized utterance.

The controlling method of an electronic apparatus according to various embodiments described above may be provided as a computer program product. The computer program product may include the S/W program itself or a non-transitory computer readable medium storing the S/W program.

The non-transitory computer readable medium is a medium that semi-permanently stores data therein, rather than a medium storing data for a short time, such as a register, a cache, a memory, or the like, and is readable by a device. In detail, various applications or programs described above may be stored and provided in the non-transitory computer readable medium, such as a compact disk (CD), a digital versatile disk (DVD), a hard disk, a Blu-ray disk, a universal serial bus (USB), a memory card, and a read only memory (ROM).

While the disclosure has been described with reference to the embodiments, the disclosure is not limited to the aforementioned specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. A method of controlling an electronic apparatus, the method comprising:

displaying, by the electronic apparatus, a content on a display of the electronic apparatus;

identifying, by the electronic apparatus, a dedicated language model based on the content displayed on the display of the electronic apparatus;

receiving, by the electronic apparatus, an utterance of a user while the content is displayed on the display of the electronic apparatus;

recognizing, by the electronic apparatus, the received utterance through an automatic speech recognition (ASR) function of the electronic apparatus, and identifying, by the electronic apparatus, candidate texts of the recognized utterance;

identifying, by the electronic apparatus, a similarity between the recognized utterance and each of the identified candidate texts;

identifying, by the electronic apparatus, based on the identified dedicated language model and a predetermined threshold value, a suitability of a predetermined number of candidate texts with a high identified similarity, among the candidate texts, by calculating a total sum of perplexity values of the predetermined number of candidate texts, the predetermined number being two or more;

based on the identified suitability of the predetermined number of candidate texts being outside a predetermined suitability range, ignoring, by the electronic apparatus, the recognized utterance; and based on the identified suitability of the predetermined number of candidate texts being in the predetermined suitability range, identifying, by the electronic apparatus, a candidate text having a highest suitability, among the candidate texts, as the recognized utterance, and performing, by the electronic apparatus, an operation corresponding to the recognized utterance.

2. The method of claim 1, wherein the identifying the dedicated language model comprises identifying the dedicated language model based on at least one of:

a type of the displayed content, a menu of the displayed content, and an input command of the displayed content.

3. The method of claim 1, wherein the identifying the candidate text of the recognized utterance comprises identifying at least one of: a candidate word, a candidate word segment, and a candidate root based on at least one of: a word, a word segment, and a root included in the received utterance, and identifying the candidate text by combining the identified at least one of:

the candidate word, the candidate word segment, and the candidate root.

4. The method of claim 1, wherein the identifying the similarity comprises identifying the similarity based on a general-purpose text database and identifying the predetermined number of candidate texts with the high identified similarity.

5. The method of claim 1, wherein the identifying the suitability comprises calculating a word-by-word geometric mean of entropy in which a word included in the candidate text is to appear for each of the predetermined number of candidate texts based on the identified dedicated language model.

6. The method of claim 5, wherein the identifying the suitability comprises identifying the suitability by determining whether the predetermined number of candidate texts are in the predetermined suitability range based on the predetermined threshold value and a geometric mean for each word calculated for each of the predetermined number of candidate texts.

7. The method of claim 6, wherein the identifying the suitability comprises identifying one candidate text having a geometric mean for each word calculated to be the lowest.

8. The method of claim 1, further comprising:

generating a filtering language model including the ignored recognized utterance; and ignoring the recognized utterance based on the recognized utterance being included in the utterance included in the filtering language model.

9. An electronic apparatus comprising:

a display;

a microphone;

a memory storing instructions; and a processor configured to execute the instructions to:

control the display to display a content, control the microphone to receive an utterance of a user while the content is displayed on the display, identify a dedicated language model based on the content displayed on the display, recognize, through an automatic speech recognition (ASR) function of the electronic apparatus, the received utterance to identify candidate texts of the recognized utterance, identify a similarity between the recognized utterance and each of the identified candidate texts, identify, based on the identified dedicated language model and a predetermined threshold value, a suitability of a predetermined number of candidate texts with a high identified similarity, among the candidate texts, by calculating a total sum of perplexity values of the predetermined number of candidate texts, the predetermined number being two or more, based on the identified suitability of the predetermined number of candidate texts being outside a predetermined suitability range, ignore the recognized utterance, and based on the identified suitability of the predetermined number of candidate texts being in the predetermined suitability range, identify a candidate text having a highest suitability, among the candidate texts, as the recognized utterance and perform an operation corresponding to the recognized utterance.

10. The electronic apparatus of claim 9, wherein the processor is further configured to execute the instructions to identify the dedicated language model based on at least one of:

a type of the displayed content, a menu of the displayed content, and an input command of the displayed content.

11. The electronic apparatus of claim 9, wherein the processor is further configured to execute the instructions to identify at least one of: a candidate word, a candidate word segment, and a candidate root based on at least one of: a word, a word segment, and a root included in the received utterance, and identify the candidate text by combining the identified at least one of:

the candidate word, the candidate word segment, and the candidate root.

12. The electronic apparatus of claim 9, wherein the processor is further configured to execute the instructions to identify the similarity based on a general-purpose text database, and identify the predetermined number of candidate texts with the high identified similarity.

13. The electronic apparatus of claim 9, wherein the processor is further configured to execute the instructions to calculate a word-by-word geometric mean of entropy in which a word included in the candidate text will appear for each of the predetermined number of candidate texts based on the identified dedicated language model.

14. The electronic apparatus of claim 13, wherein the processor is further configured to execute the instructions to identify the suitability by determining whether the predetermined number of candidate texts are in the predetermined suitability range based on the predetermined threshold value and a geometric mean for each word calculated for each of the predetermined number of candidate texts.

15. The electronic apparatus of claim 14, wherein the processor is further configured to identify one candidate text having a geometric mean for each word calculated to be the lowest.

16. A non-transitory computer readable medium for storing computer readable program code or instructions which are executable by one or more processors to perform a method of controlling an electronic apparatus, the method comprising:

displaying, by the electronic apparatus, a content on a display of the electronic apparatus;

identifying, by the electronic apparatus, a dedicated language model based on the content displayed on the display of the electronic apparatus;

receiving, by the electronic apparatus, an utterance of a user while the content is displayed on the display of the electronic apparatus;

recognizing, by the electronic apparatus, the received utterance through an automatic speech recognition (ASR) function of the electronic apparatus and identifying, by the electronic apparatus, candidate texts of the recognized utterance;

identifying, by the electronic apparatus, a similarity between the recognized utterance and each of the identified candidate texts;

identifying, by the electronic apparatus, based on the identified dedicated language model and a predetermined threshold value, a suitability of a predetermined number of candidate texts with a high identified similarity, among the candidate texts, by calculating a total sum of perplexity values of the predetermined number of candidate texts, the predetermined number being two or more;

based on the identified suitability of the predetermined number of candidate texts being outside a predetermined suitability range, ignoring, by the electronic apparatus, the recognized utterance; and based on the identified suitability of the predetermined number of candidate texts being in the predetermined suitability range, identifying, by the electronic apparatus, a candidate text having a highest suitability, among the candidate texts, as the recognized utterance, and performing, by the electronic apparatus, an operation corresponding to the recognized utterance.

17. The non-transitory computer readable medium of claim 16, wherein the identifying the dedicated language model comprises identifying the dedicated language model based on at least one of:

a type of the displayed content, a menu of the displayed content, and an input command of the displayed content.

18. The non-transitory computer readable medium of claim 16, wherein the identifying the candidate text of the recognized utterance comprises identifying at least one of: a candidate word, a candidate word segment, and a candidate root based on at least one of: a word, a word segment, and a root included in the received utterance, and identifying the candidate text by combining the identified at least one of:

the candidate word, the candidate word segment, and the candidate root.

19. The non-transitory computer readable medium of claim 16, wherein the identifying the similarity comprises identifying the similarity based on a general-purpose text database and identifying the predetermined number of candidate texts with the high identified similarity.

20. The non-transitory computer readable medium of claim 16, wherein the identifying the suitability comprises calculating a word-by-word geometric mean of entropy in which a word included in the candidate text is to appear for each of the predetermined number of candidate texts based on the identified dedicated language model.

* * * * *